United States Statutory Invention Registration [19]

[11] Reg. Number: H755

Karl, Jr. [43] Published: Mar. 6, 1990

[54] OPTICAL REMOTE DIAGNOSTICS OF ATMOSPHERIC PROPAGATING BEAMS OF IONIZING RADIATION

[75] Inventor: Robert R. Karl, Jr., Los Alamos, N. Mex.

[73] Assignee: The United States of America as represented by the United States Department of Energy, Washington, D.C.

[21] Appl. No.: 306,131

[22] Filed: Feb. 3, 1989

[51] Int. Cl.[4] ..... G01N 21/64
[52] U.S. Cl. ..... 250/458.1; 250/459.1
[58] Field of Search ..... 250/458.1, 459, 306, 250/307, 310

[56] References Cited

U.S. PATENT DOCUMENTS

| | | | |
|---|---|---|---|
| 2,952,776 | 9/1960 | Schumacher | 250/310 |
| 3,154,681 | 10/1964 | Ziegler | 250/310 |
| 3,612,859 | 10/1971 | Schumacher | 250/307 |

*Primary Examiner*—Thomas H. Tarcza
*Assistant Examiner*—Linda J. Wallace
*Attorney, Agent, or Firm*—Ray G. Wilson; Paul D. Gaetjens; Judson R. Hightower

[57] ABSTRACT

Data is obtained for use in diagnosing the characteristics of a beam of ionizing radiation, such as charged particle beams, neutral particle beams, and gamma ray beams. In one embodiment the beam is emitted through the atmosphere and produces nitrogen fluorescence during passage through air. The nitrogen fluorescence is detected along the beam path to provide an intensity from which various beam characteristics can be calculated from known tabulations. Optical detecting equipment is preferably located orthogonal to the beam path at a distance effective to include the entire beam path in the equipment field of view.

12 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTICAL REMOTE DIAGNOSTICS OF ATMOSPHERIC PROPAGATING BEAMS OF IONIZING RADIATION

This invention is the result of a contract with the Department of Energy (Contract No. W-7405-ENG-36).

BACKGROUND OF THE INVENTION

This invention relates to beams of ionizing radiation and, more particularly, to noninterfering diagnostics for determining the performance characteristics of beams of ionizing radiation.

It is necessary to measure various characteristics of ionizing radiation beams. e.g., charged particle beam, neutral particles beam, or gamma ray beam, in order to determine overall beam performance, to determine the effects of accelerator beam line modifications (tuning) on beam performance, or the effects of changed operating parameters on beam propagation performance. etc. In one available technique, direct current or energy observations can be made with either a Faraday cup or a thermopile to measure the primary beam in the last stage of the vacuum transport and the net beam current after the beam exists the vacuum through a foil window. However, the detectors directly interact and can consume the particle beam, but provide no information on the downrange propagation through the atmosphere.

In another technique, electron voltage and voltage spread can be determined through independent magnetic sector experiments. Charged particles will be deflected at various angles by a magnetic field where the angle is a function of the particle energy and the angular spread is a measure of the energy spread. Again, the particle beam is consumed in the experiment. Propagation and dispersion properties can also be observed with open shutter photography and gated intensified photography of the beam in air. However, the photographic techniques can pick up beam instabilities and the film can introduce non-linearities in the observed characteristics.

Accordingly, it is an object of the present invention to provide a single diagnostic method for determining a significant number of beam parameters for beams of ionizing radiation.

It is another object of the present invention to provide a diagnostic method for beams of ionizing radiation which does not interfere with beam properties.

One other object of the present invention is to non-invasively measure the electron voltage and energy in a propagating charged particle beam by two independent analysis procedures.

In accordance with the present invention, an optical diagnostic method for beams of ionizing radiation is provided to measure the beam performance characteristics during the atmospheric propagation of the beam of ionizing radiation.

SUMMARY OF THE INVENTION

To achieve the foregoing and other objects, and in accordance with the purposes of the present invention, as embodied and broadly described herein, this invention comprises a method for obtaining data useful in diagnosing the characteristics of a beam of ionizing radiation defining a beam path when emitted into the atmosphere. A selected fluorescence interaction of the beam propagating in the atmosphere is defined, from which interaction a number of beam properties can be determined A detector is then positioned in a manner effective to detect the selected interaction at a location along the beam path which is effective to observe at least a portion of the beam path. The selected interaction produced by a pulse of the beam is then detected along at least the portion of the beam path observed by the detector In a particular embodiment of the present invention, a method is providing for obtaining data useful in diagnosing the characteristics of a relativistic electron beam which defines a beam path when emitted into the atmosphere. A detector is positioned at a location which is effective to include at least a portion of the beam path within the field of view of the detector. The optical fluorescence from selected spectral events during passage of the electron beam through the atmosphere is then detected. From the detected fluorescence, various characteristics of the electron beam can be determined which are determinative of the beam performance.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
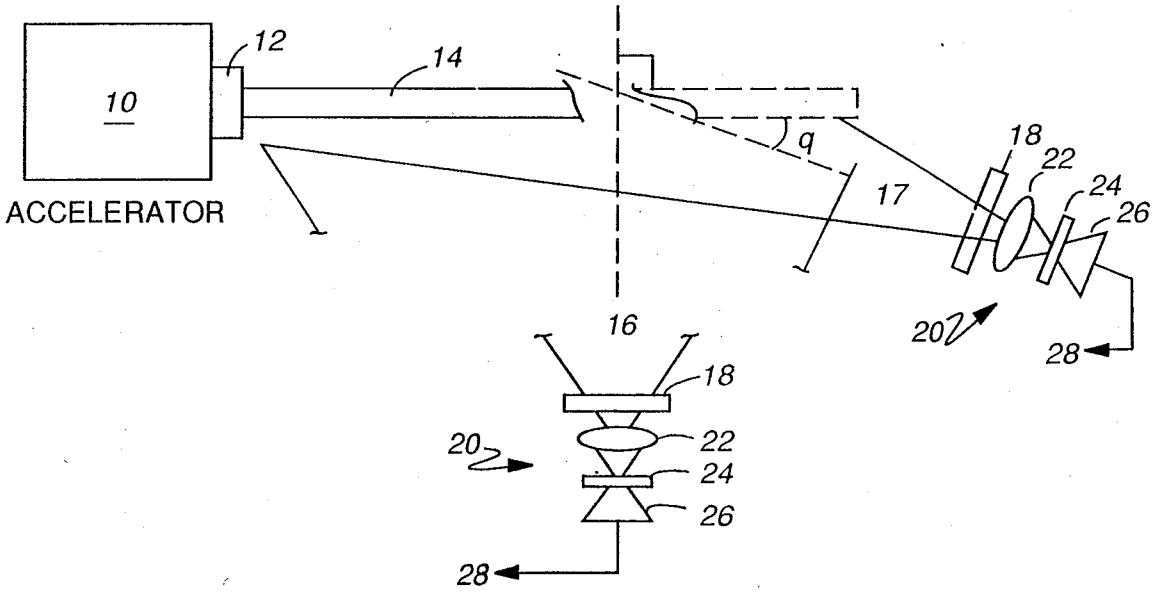
FIG. 1 is a schematic illustration of apparatus for carrying out the method according to the present invention.

In accordance with the present invention, the interaction of a beam of ionizing radiation in air is detected to provide data which is effective to determine a substantial number of beam characteristics, such as beam current, pulse length, charge losses, electron transport efficiency, total energy deposited in air, and/or electron voltage from both the election range in air and total beam charge. The term beam as used herein means a beam of ionizing radiation such as a neutral particle beam, gamma ray beam, and charged particle beam of electrons or protons. The selection of beam characteristics to be determined is functionally related to the specific beam type.

The atmosphere provides a natural energy filter for ionizing radiation, such as relativistic electrons. Detectors, such as photomultiplier tubes (PMT'S). measure the air fluorescence generated by beam losses with the atmosphere as a function of time. The detection system is calibrated for absolute detector sensitivity. The range, atmospheric transmission, and the fluorescence efficiency data are displayed as propagating charge versus range, and can be further interpreted to generate a plurality of the above beam characteristics.

The transport of a high energy beam of ionizing radiation in the atmosphere is accompanied by a loss of energy to the atmosphere, propagating particles have collisional losses where the energy loss rate is dependent on atmospheric density. However, at a given atmospheric density, the collisional energy loss rate is nearly a constant value for particle energies greater than one MeV. For example, for relativistic electrons, the energy loss rate is about 2.5 keV/cm at one atmosphere pressure. Tabulated values for the energy loss rate of electrons are provide in M. J. Berger, et al. "Stopping power and Ranges of Electrons and Positrons." NBSIR-82-2550A, December 1982.

Losses from a particle beam also occur from Bremsstrahlung (X-ray). and Cerenkov radiation. These losses show a marked increase in the energy loss rate at increasing particle energies. Such losses occur from beam particle collisions with the vacuum transport pipe which delivers the beam to the atmosphere. These collisions generate protons which deposit energy in the atmosphere at longer ranges than energy deposition from the collisional losses. A tabulation of the cross-section and range of X-rays for different X-ray energies is tabulated in Los Alamos Laboratory Report 3753 (1968) for energies from 0.001 to 100 MeV for elements 1 through 100.

For a relativistic electron beam, the range of electrons in air has been tabulated in the Berger reference as the Continuous Slowing Down Approximation (CSDA) range in g/cm$^2$ (distance x air density). For example, 15, 50, or 250 MeV electrons have listed ranges of 7.4, 19.5, and 59.5 g/cm$^2$, respectively, which correspond to ranges of 60, 160, and 490 m in full density atmosphere.

The deposition of energetic particles into the atmosphere causes the emission of a characteristic blue glow associated with the fluorescence of nitrogen, both $N^2$ and $N_2+$. The strongest characteristic nitrogen emissions a e 337.1 nm ($N^2$) and 391.4 nm ($N_2+$) with absolute fluorescence efficiencies (optical energy output/energy deposited in air) of $2.7\times10^{-5}$ and $7.1\times10^{-6}$, respectively. The emission efficiencies for nitrogen are generally constant with altitude and are dependent only upon the total energy deposited in the air and not upon the type or energy of a particular ionizing radiation or particle. Thus, the atmospheric energy losses can be characterized by nitrogen fluorescence emissions at these characteristic wavelengths.

The energy lost in the vacuum transport pipes from the accelerator to the atmosphere can be determined from the atmospheric fluorescence generated by X-rays originating from stray beam particle interactions with the pipe walls. The detected optical data will indicate an intensity inflection beyond the range of the energy deposited by propagating electrons. The resulting X-ray optical intensity levels can be extrapolated back to the source to determine the total beam energy lost to X-rays produced from particle wall collisions.

According to the present invention, data are obtained by optical observations taken along the flight path of the charged particle beam. A preferred observation is normal to the beam flight path at a distance where the entire flight path is within the field of view of the detector. For other view angles, with electrons moving at the speed of light, the electrons that create the light are moving to either shorter or longer ranges from the detector. Further, if the flight path length causes a significant change in range (R) to the detector, the intensity must be modified by $1/R^2$ changes of the solid angle received by the detector.

A data acquisition system is schematically depicted in FIG. 1 for accomplishing the method of the present invention. Accelerator 10 generates particle beam 14 into the atmosphere through particle transport pipe 12. Optical equipment for detecting fluorescence along the beam path is positioned to observe at least a portion of the beam path. A low gain (5.000 X, 1-stage microchannel plate) photomultiplier (PMT) 26 detects the fluorescence along the beam path. Commercial devices are readily available with linear current output signals versus optical inputs for output currents that do not exceed 1.0 A over short intervals and which have rise and fall times less than a nanosecond to effectively follow the optical inputs. The optical signal is conditioned to detect one emission line through optical interference filter 18, which has a relatively narrow beam pass. e.g. 2.5 nm. at the selected observation wavelength. Field stop 24 is placed in the focal plain of lens 22 to limit the field of view to angles effective to prevent optical spectral tuning of the filter transmission with angle through filter 18. A field of view up to 5.8° has been found satisfactory to preclude spectral tuning through interference filter 18. The optical signal is focused through lens 22 which may have an aperture from 50 nm for kilometer range use or a meter diameter for use at hundreds of kilometers. Output signal 28 is passed to a fast commercial oscilloscope, e.g. Tektronix Model 7104, for display and recording. A response time of 350 ps has been found to be satisfactory.

The optical detection system is preferably placed with a normal view 16 of beam path 14. In a preferred placement, optical detection system 20 is located at a long distance from beam path 14 wherein the entire length of beam path 14 is within the field of view (FOV) 16 of detection system 20. If detection system 20 cannot be sufficiently remote from beam path 14, only a portion of the beam need be observed for any given pulse. Detection system 20 can then be moved along beam path 14 for subsequent observations until the entire path length has been observed. Measurement problems arise in traversing the entire beam path due to FOV overlap and the repeatability of subsequent beam pulses.

Where only a restricted normal displacement from beam path 14 is available, optical detection system 20 may be located at an angle $\theta$ relatively to beam path 14. The angular placement enables a limited FOV to observe the entire beam length at a reduced distance from beam path 14. A change in the viewing angle $\theta$ causes a change in the optical intensity and pulse duration, but the total area under the intensity-time curve, or energy curve, does not change with angle, i.e., the intensity increases as the detected pulse length decreases. The calculated beam range must be corrected for the angle as (1-cos $\theta$).

Figure 2:
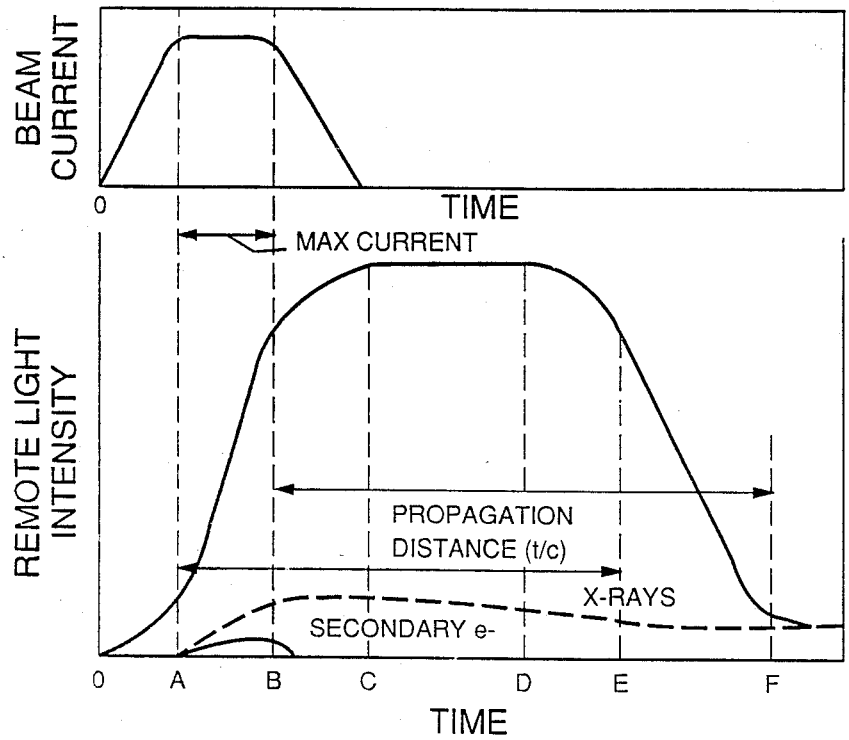
FIG. 2 graphically illustrates a single optical power-time curve output by the apparatus of FIG. 1.

As beam 14 propagates in air, the fluorescence intensity is directly related to the total charge in the charged particle beam and the intensity duration can be directly translated to a beam range when the particle velocity is known. FIG. 2 graphically illustrates a typical output signal 28 (FIG. 1) from pMT 26 having a field of view normal to particle beam 14. Particle beam 14 may typically be a pulse of electrons having 15 MeV energy and a pulse duration of 50 ps with a 20 ps rise and fall times. The range in air for a pulse of nearly monoenergetic electrons can be determined from the corresponding light intensity signal as shown in FIG. 2. Equivalent flight times are obtained from the time of first emission (0) to the time of first termination of propagation (D); the time from the start of maximum current (A) to the end of maximum propagation (E); or from the tail emission (B) to the tail termination (F). The particle range is a measure of the particle energy. Another independent determination of the average beam energy is obtained by dividing the integral of the intensity-time curve, a measure of the total pulse energy, by the peak amplitude of the intensity, a measure of the total charge in the particle beam. From the intensity-time curve, a substantial number of beam characteristics can be derived. The beam energy deposited in air is determined by:

$$P = \text{Energy Deposit} = \frac{V_s \times K(\lambda) \times 4\pi \times R_s^2 \times R_E^2 \times \Delta\lambda}{R_c^2 \times I(\lambda, V)\, 50\,\Omega \times T(\lambda) \times E(\lambda)}, \quad (1)$$

where $V_s$=oscilloscope voltage at 50Ω input
$\Delta\lambda$=photometer bandpass
$K(\lambda)$=irradiance calibration standard (W/cm$^2$nm) at range $R_s$
$I(\lambda,V)$=current from irradiance calibration standard at range $R_c$
$R_E$=experiment range $$T(\lambda) = \text{atmospheric transmission} = \text{intensity at } R_E/\text{intensity at source} = e^{-R\sigma}, \text{ where } \sigma \text{ is tabulated atmospheric extinction}$$

The calculation of the charge of beam 14 that is within the detector's FOV 16 is based on the rate the charged particles lose energy as a function of time. For electrons the collisional energy loss rate is 2.5 keV/cm with a corresponding time loss rate of $8.3\times10^{13}$ e V/s for relativistic particles. The electron charge is then:

$$Q = I \times T = \frac{P}{V} \times T = P/(V/T) = \frac{\text{Power of Energy Deposition}}{\text{Time Rate of Voltage Loss}}, \quad (2)$$

where

I=beam current
V=beam voltage
T=propagation time

A primary parameter of charged particle beam performance is the beam energy. The present invention provides two (2) independent methods for determining beam energy: a range determination which is appropriate for a monochromatic beam and averaging method which does not depend on calibration. The electron range is determined using the energy filtering characteristic of air. The beam time of flight, i.e.. the intensity of the optical signal from the relativistic particles, such as electrons, is directly determined. From CSDA tabulations, the particle energy can be readily calculated. If the beam is not monoenergetic, then a sample CSDA fit is inappropriate for the CSDA technique. However, a Monte Carlo electron-to-X-ray conversion model may be used to provide outputs at various voltage and charge mixtures to fit the optical data.

In another method, the total area of the detected intensity curve. i.e., the emission power-time curve, is divided by the peak optical intensity. The integrated value is directly related to the total beam power and the peak value is directly related to the total beam charge. It should be noted that this technique does not require calibrated instruments since the calibration factors cancel from the equation.

To accurately determine the total beam power, energy loss to the transport piping 12 (FIG. 1) walls must be determined. Beam interaction with the walls produces X-rays whose energy can be determined by extrapolating optical data back to the source, as hereinafter described.

Figure 3:
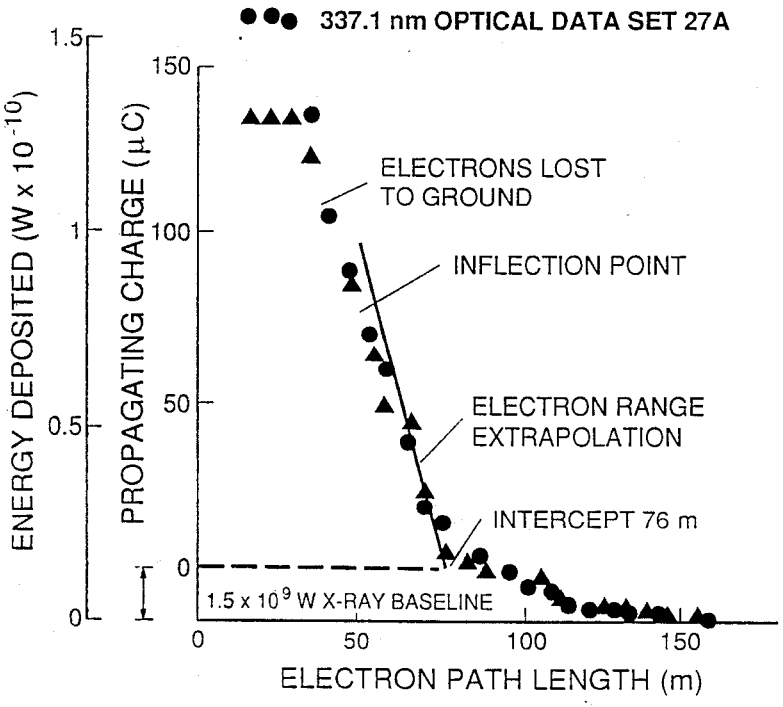
FIG. 3 is a graph showing actual data taken at right angles to the beam path.
Figure 4:
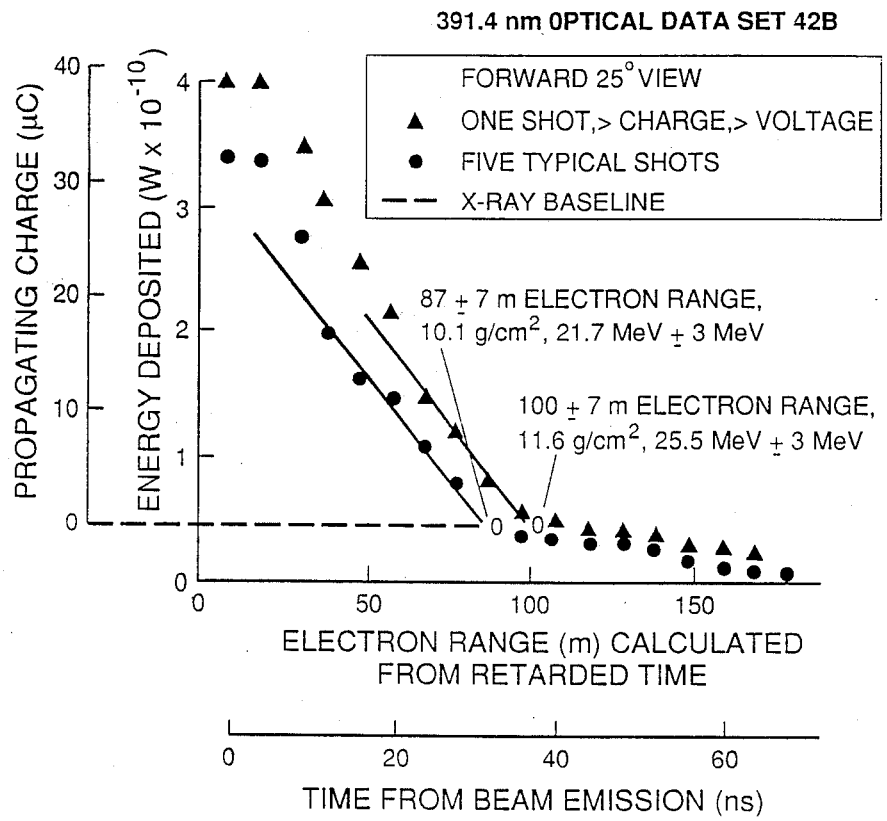
FIG. 4 is a graph showing reduced data taken at 25° forward angle along the beam flight path.

Data from actual atmospheric emission tests are shown in Table A and in FIGS. 3 and 4.

The data were taken at night to avoid large solar background radiation. However, daylight operation could be obtained using an external trigger for a solar blind photomultiplier. Data sets 87-27 and 87-28 were taken at a range of 529 m normal to the beam and with photometers for each of the selected nitrogen emissions at 337.1 nm and 391.4 nm. The FOV of the detectors did not enable the entire beam length to be included, so the system was sequentially scanned along the beam path. Intensity data were reduced to propagating charge and deposited energy data for a presentation in FIG. 3 for the data set at 337.1 nm. Table A illustrates the number of parameters derivable from the intensity-time data and the high degree of correspondence between the data at the two wavelengths. FIG. 3 also illustrates the X-ray energy deposition beyond the electron range which arises from electron collisions with the transfer tube walls.

The 87-42 data sets of Table A were taken from a forward sight at a longer range of 973 m with a 25° angle to the beam. The entire beam path was then within the FOV of the photometers.

TABLE A

| Shot | λ (nm) | Duration of Max. Current (ns) | Full Length of Pulse (ns) | Optical Intensity (W) | Peak Deposition (W) | Propagating Charge (μC.) |
|---|---|---|---|---|---|---|
| 87-27 | 337.1 | 26 | 38 | $5.0 \times 10^5$ | $1.5 \times 10^{10}$ | 150 |
| | 391.4 | 26 | 38 | $1.6 \times 10^5$ | $1.4 \times 10^{10}$ | 140 |
| 87-28 | 337.1 | 26 | 38 | $4.5 \times 10^5$ | $1.5 \times 10^{10}$ | 130 |
| | 391.4 | 26 | 38 | $1.5 \times 10^5$ | $1.4 \times 10^{10}$ | 140 |
| 87-42 | 337.1 | 17 | 19 | $7.3 \times 10^5$ | $3.5 \times 10^{10}$ | 32 |
| | 391.4 | 17 | 19 | $2.4 \times 10^5$ | $3.4 \times 10^{10}$ | 32 |
| 87-42 | 337.1 | 18 | 20 | $8.1 \times 10^5$ | $>4.2 \times 10^{10}$ | 40 |
| | 391.4 | 18 | 20 | $2.8 \times 10^5$ | $4.0 \times 10^{10}$ | 39 |

| Shot | Energy Deposition (kJ) | Voltage E/Q (MeV) | Maximum Current (kA) | Average Current (kA) | Propagation Distance (m) | Voltage Air Range (MeV) | X-ray Energy (J) |
|---|---|---|---|---|---|---|---|
| 87-27 | 2.0 | 13.3 | 5.7 | 3.9 | 71 | 17 | 370 |
| | 2.0 | 14.2 | 5.6 | 3.9 | 70 | 17 | 350 |
| 87-28 | 1.9 | 14.6 | 5.7 | 3.9 | 71 | 17 | 370 |
| | 2.0 | 13 | 5.7 | 3.9 | 71 | 17 | 350 |

TABLE A-continued

| | | | | | | | |
|---|---|---|---|---|---|---|---|
| 87-42 | 0.9 | 24 | 5.2 | 4.3 | 85 | 22 | 200 |
| | 0.78 | 25 | 4.5 | 4.1 | 85 | 22 | 200 |
| 87-42 | 1.1 | 27 | 6.1 | 5.5 | 100 | 25 | 200 |
| | 0.98 | 25 | 5.4 | 4.9 | 100 | 25 | 200 |

shots and a range of almost 100 m for an enhanced shot. The X-ray baseline energy deposition is again evident from FIG. 4.

The method of the present invention has been particularly illustrated by the interaction of an electron beam in air to produce nitrogen emissions at selected wavelengths, including 337.1 nm and 391.4 nm. The method is intended to be generally applicable to particle beams which produce fluorescence in air which can be optically detected. While the selected nitrogen emissions are preferred, other spectral lines could be selected to enable the detected intensity data to be converted to energy deposition and/or propagating charge.

Application of the present invention to other beams of ionizing radiation. i.e., charged particle beams, neutral particle beams, and gamma-ray beams, is readily apparent from the above description, particle beams have the same energy loss rate as relativistic electron beams and the CSDA range is available from the Berger reference. The range of gamma-rays may be found in Los Alamos Laboratory Report 3753 (1968), as hereinabove described for X-rays. In all cases, the interaction with the atmosphere produces nitrogen fluorescence which is measured and detected as discussed above.

The foregoing description of the preferred embodiments of the invention have been presented for purposes of illustration and description. It is not intended to be exhaustive or to limit the invention to the precise form disclosed, and obviously many modifications and variations are possible in light of the above teaching The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for obtaining data useful in diagnosing the characteristics of a beam of ionizing radiation defining a beam path when emitted into the atmosphere, comprising the steps of:

defining a selected fluorescence optical interaction of said beam in atmosphere;

positioning a detector effective to detect said selected optical interaction at a location along said beam path effective to observe at least a portion of said beam path; and detecting said selected optical interaction produced by a pulse of said particle beam along said at least a portion of said beam path.

2. A method according to claim 1, wherein said beam of ionizing radiation is a relativistic electron beam.

3. A method according to claim 2, wherein said selected optical interaction is nitrogen fluorescence from atmospheric collisions of said electron beam.

4. A method according to claim 1, wherein positioning said detector includes the step of locating said detector at a distance orthogonal to said beam path effective for said at least a portion of said beam path to be within field of view of said detector.

5. A method according to claim 4, wherein said at least a portion of said beam path includes the entire beam path.

6. A method according to claim 1, wherein positioning said detector includes the step of locating said detector at an angle relative to said beam line effective for a field of view of said detector to include the entire length of said beam path.

7. A method according to claim 1, wherein detecting said selected interaction includes the steps of:

filtering emissions from said beam path with an interference filter for said selected interaction; and limiting the field of view of said detector to preclude angled transmissions through said interference filter of events which do not arise from said selected interaction.

8. A method for obtaining data useful in diagnosing the characteristics of a relativistic electron beam defining a beam path when emitted into the atmosphere, including the steps of:

positioning a detector at a location effective to include at least a portion of said beam path within a field of view of said detector; and detecting optical fluorescence from selected spectral events during passage of said electron beam through said atmosphere.

9. A method according to claim 8, wherein said spectral event is nitrogen fluorescence at a wavelength of 337.1 nm or 391.4 nm.

10. A method according to claim 9, wherein detecting optical fluorescence includes the steps of:

filtering emissions from said beam path with an interference filter to detect only said fluorescence at 337.1 nm or 391.4 nm; and limiting the field of view of said detector to preclude angled transmissions through said interference filters at wavelengths other than 337.1 nm or 391.4 nm.

11. A method according to claim 10, wherein positioning said detector includes the step of locating said detector path at a distance orthogonal to said beam path.

12. A method according to claim 10, wherein positioning said detector includes the step of locating said detector at an angle relative to said beam path effective for said field of view of said detector to include the entire length of said beam path.

* * * * *